US010789221B2

(12) United States Patent
Ravichandran et al.

(10) Patent No.: US 10,789,221 B2
(45) Date of Patent: Sep. 29, 2020

(54) MIGRATING ACROSS DATABASE DEPLOYMENTS

(71) Applicant: Facebook, Inc., Menlo Park, CA (US)

(72) Inventors: Kaushik Ravichandran, Seattle, WA (US); Maxwell T. Sayles, Seattle, WA (US); Muthukaruppan Annamalai, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 584 days.

(21) Appl. No.: 15/702,687

(22) Filed: Sep. 12, 2017

(65) Prior Publication Data
US 2019/0079929 A1    Mar. 14, 2019

(51) Int. Cl.
*G06F 16/21*        (2019.01)
(52) U.S. Cl.
CPC ................. *G06F 16/214* (2019.01)
(58) Field of Classification Search
None
See application file for complete search history.

(56) References Cited

U.S. PATENT DOCUMENTS

| 2013/0007220 | A1* | 1/2013 | Astle | G06F 16/119 709/219 |
| 2013/0290249 | A1* | 10/2013 | Merriman | G06F 16/273 707/610 |
| 2016/0142475 | A1* | 5/2016 | Kathuria | H04L 67/1008 709/203 |
| 2018/0349419 | A1* | 12/2018 | Annamalai | G06F 16/214 |

* cited by examiner

Primary Examiner — Amresh Singh
(74) Attorney, Agent, or Firm — FisherBroyles, LLP

(57) ABSTRACT

Technology for migrating database shards from a source deployment to a destination deployment can be accomplished while maintaining a particular level of availability, reliability, and consistency. A process for this migration can include setting up destination shards as followers of shards on the source such that the destination shards receive stored data and have write operations mirrored from the source shards to the destination shards. The process can set an epoch counter for the destination shards higher than a corresponding epoch counter for the source shards. Next, the process can disable writing for the source shards. The process can also perform a special write to determine when the source write pipeline is empty. The process can wait for the shard migration to complete, then configure the destination shards to no longer be followers of the source shards, but instead be primary shards to handle database operations for the stored data.

20 Claims, 5 Drawing Sheets

MIGRATING ACROSS DATABASE DEPLOYMENTS

BACKGROUND

Large database providers often serve multiple deployments. A "deployment" is a cluster of database resources that are independent from the resources dedicated to other deployments. A deployment can be managed independently of other deployments and can have a dedicated set of database servers (e.g. physical servers or virtual servers). A deployment can include the database storage and services associated with managing and providing access to that storage.

Database providers often initially operate in an ad-hoc manner, providing different deployments for different use cases. For example, as database use cases arise, the administrator can allocate a certain number of database servers to each use case. This provides isolation and customization for the different use cases. However, providing different deployments can cause inefficiencies in both resource allocation and management costs.

For example, a database provider may provide 100 deployments, each with ten dedicated servers. On average, each deployment may initially use 60% of the resources dedicated to that deployment. However, over time, some heavy-use deployments may begin to exceed the resources allocated to that deployment. In some cases, the database administrator may not be able to reconfigure the heavy-use deployments to have additional resources because these resources are already dedicated to other deployments, even though those other deployments are not making use of them. Furthermore a database administrator tasked with deploying an update to each of the hundred different deployments would have to separately update each of the hundred deployments.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
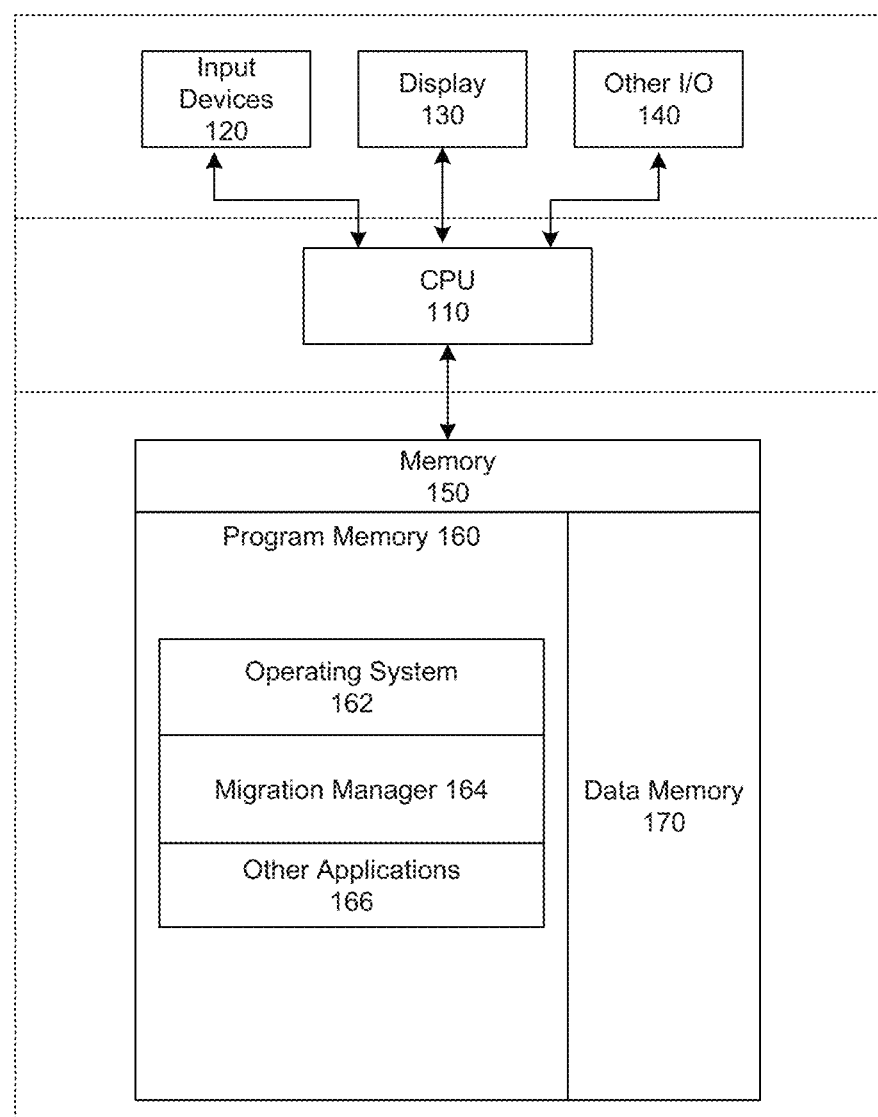
FIG. 1 is a block diagram illustrating an overview of devices on which some implementations can operate.

Embodiments for migrating database shards across deployments are described. Where database systems provide multiple deployments, it can be beneficial to migrate a set of shards across deployments. A shard is a partition of a database that is housed within a particular database server instance. A particular deployment can include one or more shards. Migrating shards across deployments can be performed when combining multiple deployments into a single deployment, e.g. into a multitenant or wildcard environment such that the deployments share configurations and resources. For example, in an environment with multiple individual deployments, a new combined multitenant deployment can be created and the shards from each of the individual deployments can be migrated to the multitenant deployment. Migrating shards across deployments can also be performed when dividing a single deployment into two or more deployments, e.g. to provide greater isolation or a unique configuration for the individual deployments. As another example, a deployment serving multiple use cases can be splintered by creating a new deployment and migrating the shards corresponding to a particular use case to the new deployment.

When migrating shards from a source deployment to a destination deployment, properties of the source deployment should be maintained. For example, a source deployment can have a particular level of availability, reliability, and consistency, and these properties should be maintained to a particular degree both in by the destination deployment and during the migration. A process for migrating a selection of shards from a source to a destination deployment can include setting up the destination shards as "followers" of shards on the source. Follower shards may not be configured to directly receive read/write traffic from clients, but instead are configured to receive a copy of data on source followed shards as well as have write operations, from clients, applied to the destination follower shards when applied to the source followed shards.

When a threshold amount of the data has been copied to the destination shards, an "epoch counter" for the destination shards can be set to be higher than a corresponding epoch counter for the source shards. An epoch counter is a configuration setting that controls which set of shards can act on write operations. When a write can correspond to multiple sets of shards, e.g. shards on the source or shards on the destination, only the set of shards with the corresponding highest epoch counter will accept the write operation. This is accomplished through a configuration of a head node for a database system using epoch values to select a viable deployment for a write. By setting the destination epoch to be higher than the source epoch, any writes sent to the source after the migration will no longer be accepted.

Once the epoch counter for the destination is updated, write operations or both write and read operations can be disabled for the source shards. The system can also perform several validations including verifying that writes are blocked, that the write pipeline for the source shards is empty, and that the same writes have been performed on both the source and destination shards. At this point, clients can also be notified to use the destination shards for future database operations.

The system can then wait for the shard migration to be complete, at which point the system can configure the source shards to no longer be followed, e.g. the source shards stop sending any received new write operations to the destination shards. The system can then configure the destination shards to no longer be followers of the source shards, but instead be the primary shards to handle database operations for the stored data. This can be verified by performing test read and write commands with the destination deployment.

In some implementations, shards can be migrated in batches of one or more shards at a time, instead of migrating all the shards for a particular deployment. Because only the batch being migrated experiences down-time, migrating in batches can reduce the amount of down-time clients experience.

Migrating shards between deployments provides several previously unrealized benefits while maintaining a particular level of availability, reliability, and consistency. In some cases where the migration includes combining individual deployments, the benefits can include a reduction in the resources required to manage the deployments. Instead of having multiple independent deployments which have to be individually managed, a single management operation can apply to multiple use cases that are operating under the same deployment. This is particularly true where the hardware allocated to each deployment can be different, making it much less likely that a single management operation can be effectively automated applied across multiple deployments. Furthermore, co-locating use cases under a single deployment increase the overall availability of resources, as each use case can use all available resources without having to modify the deployment.

In some cases where the migration includes dividing a deployment into multiple separate deployments, the benefits can include increased isolation and greater configuration flexibility. For example, a use case may need special dedicated resources which the database administrator wants to guarantee other deployments don't infringe upon, and thus can migrate the use case to its own deployment. As another example, a particular use case may benefit from a special configuration that would be detrimental to other use cases, and thus the particular use case can be migrated to a deployment with the special configuration.

In either case of merging multiple deployments or dividing a single deployment, the technology described herein provide the above benefits while also maintaining a high level of availability, reliability, and consistency, which is not possible through other means of database migration, such as simply disabling the source and destination and transferring the data.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can manage the migration of shards between deployments. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, migration manager 164, and other application programs 166. Memory 150 can also include data memory 170 that can include data to migrate, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
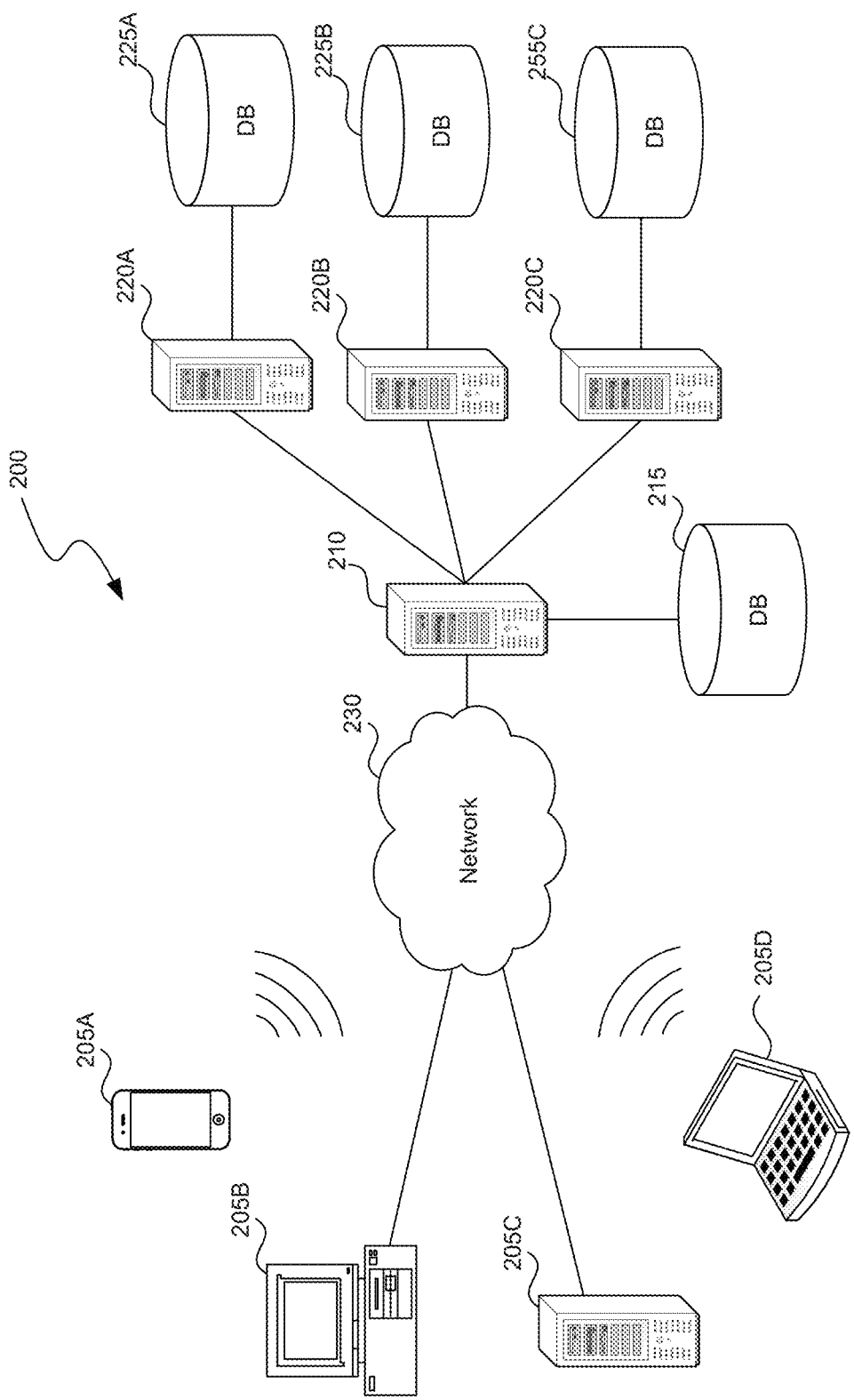
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as database shards corresponding to particular deployments. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
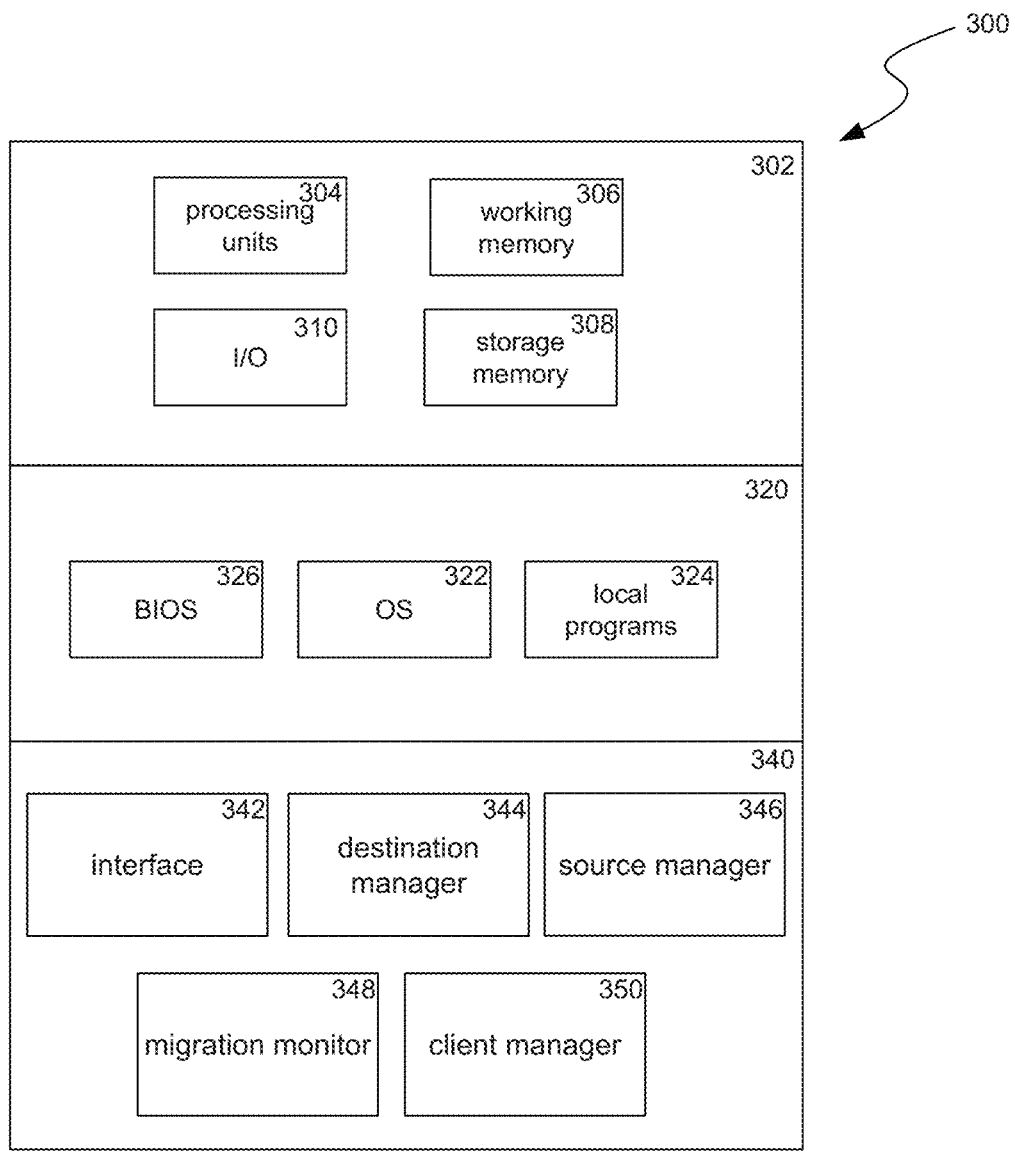
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include destination manager 344, source manager 346, migration monitor 348, and client manager 350, and components which can be used for transferring data and controlling the specialized components, such as interface 342. In some implementations, components 300 can be in a computing system that is distributed across multiple computing devices or can be an interface to a server-based application executing one or more of specialized components 340.

Destination manager 344 can cause various configurations and operations to be performed at a "destination" server/database system, which will receive shards migrated from a "source" server/database system. Destination manager 344 can begin a migration process by communicating with the destination to create follower shards to store the information from the source shards. In some implementations, destination manager 344 can accomplish this by first having flags set at the destination which will cause a subsequent shard creation operation create the shards as followers, which block direct client read and write operations to the follower shards. When destination manger 344 instructs the flags to be set, it can wait for the flags to propagate to various server machines that make up the destination system. Once the flags propagate, destination manager 344 can send commands that will cause the follower shards to be created at the destination.

Source manager 346 can cause various configurations and operations to be performed at the source server/database system, which will migrate send shards to a destination server/database system. Once the destination manager 344 has caused the follower shards to be created at the destination, source manager 346 can configure the source to begin sending data from the source shards to the shards at the designation. In some implementations, this can occur by setting flags for the source shards to be "followed shards," which can cause them to send their data to the follower shards at the destination and also mirror future write operations to the follower shards. When the source manger 346 instructs the flags to be set, it can wait for the flags to propagate to various server machines that make up the source system.

Migration monitor 348 can monitor the status of the migration from the source to the destination and notify destination manager 344 when a threshold amount (e.g. 10k database instances) of the data has been migrated.

When destination manager 344 receives the notification from the migration monitor 348, it can cause an epoch counter for the destination to be updated. In some implementations, the destination epoch counter can be set to be a specified amount (e.g. +1 or +2) greater than an epoch counter of the source. In some implementations, the value of the epoch counter of the source can be obtained by source manager 346. Setting the epoch counter of the destination higher than the epoch counter of the source will ensure that the source will not accept new write operations after the data migration occurs.

Next, source manager 346 can cause a configuration at the source to prevent further writes (and also reads in some cases) from being accepted by the source. In some implementations, source manager can accomplish this by setting a flag at the source corresponding to the source shards indicating the source shards are not accepting further writes (or is not accepting further writes and reads). When the source manger 346 sets the flag, it can wait for the flag to propagate to various server machines that make up the source system. Source manager 346 can also verify that there are not further writes that are pending in a write pipeline. This can be accomplished by causing a special test write operation to be performed by the source that will only return once the write is completed. This can also include checking that a score that tracks a count of instances that have been stored is the same for a source as a corresponding score for the destination. When the scores are the same, it signifies that the source and destination are caught up to the same state.

Client manager 350, can use a separate thread at this point to cause communications to be provided to client devices indicating that the clients should send future operations with the database to the destination instead of the source. From the time the source stopped accepting write operations until both: the migration is complete such that the destination can be used (as discussed below) and the client receives the update that it should use the destination instead of the source, database operations from the client will be returned as cannot be performed or will time-out.

Migration monitor 348 can continue to monitor the status of the migration from the source to the destination and notify both the destination manager 344 and the source manager 346 when all of the data from the source data has been migrated to the destination.

When source manager 346 receives the migration complete notification from the migration monitor 348, it can cause the source to stop mirroring further received write operations to the destination. In some implementations, source manager 346 can accomplish this by causing the followed flags to be taken off the source shards.

When destination manager 344 receives the migration complete notification from the migration monitor 348, it can cause the destination to stop accepting mirrored write operations from the source and setup the shards on the destination to be primary shards. In some implementations, destination manager 344 can accomplish this by causing the follower flags to be taken off the destination shards, converting them to primary shards. When the destination manger 344 instructs the follower flags to be removed, it can wait for the flags to propagate to various server machines that make up the destination system. Destination manager 344 can also perform a test write operation at the destination to verify that the destination is accepting write operations.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
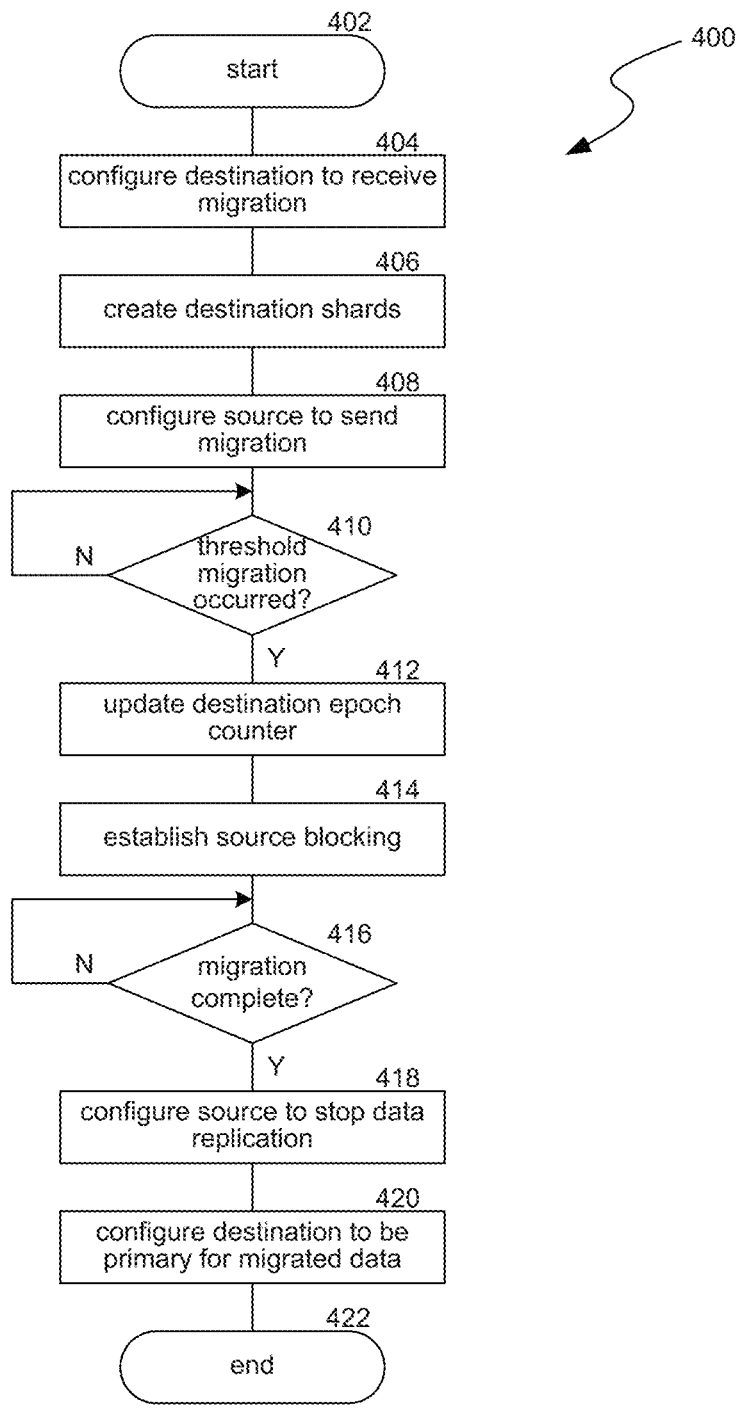
FIG. 4 is a flow diagram illustrating a process used in some implementations for migrating database shards across deployments.

FIG. 4 is a flow diagram illustrating a process 400 used in some implementations for migrating database shards across deployments. In some implementations, a deployment can include multiple shards and migrating the shards can be performed in batches, where process 400 is performed on individual subsets of the multiple shards of the deployment. This decreases the amount of downtime that clients can experience because the clients do not have to wait for the entire deployment to be migrated before instances of shards are available. In addition, part of the initializing process 400 can include some validations such as confirming that the source exists or that the destination has sufficient space or other resources to handle the migrated deployment.

Process 400 begins at block 402 and continues to block 404. At block 404, process 400 can cause a configuration, at the destination, to receive the migration. In some implementations, this configuration can be setting a flag which will cause new shards to be created as follower shards. Follower shards are shards that do not accept normal read and write operations from clients, but instead, receive the data from a followed shard and have write operations from the followed shard mirrored to it. In some implementations, a destination can includes multiple machines, so once this configuration is provided, process 400 can wait for the change to propagate to each of the multiple destination machines.

At block 406, process 400 can cause shards at the destination to be created to house information to be migrated. These shards can be created as follower shards. Where the configuration at block 404 included setting follower flags, the created shards are created as follower shards by virtue of the set follower flags at the destination.

At block 408, process 400 can cause a configuration, at the source, which initiates sending, to the shards created at block 406 at the destination, both data from shards at the source and write operations on those shards. In some implementations, this configuration can comprise setting a followed flag for the source shards. In some implementations, a source can includes multiple machines, so once this configuration is provided, process 400 can wait for the change to propagate to each of the multiple source machines.

At block 410, process 400 can determine whether a threshold amount of the data has been migrated from the source to the destination. In various implementations, the threshold can be a number of instances from the source (e.g. 10,000 instance) or an amount of transfer time (e.g. several seconds or several minutes). In various implementations, identifying if the threshold has been met can be accomplished via data received from the source indicating how much the source has sent, via data received from the destination indicating how much the destination has received, via data received from an intermediary between the source and the destination indicating how much migration data has passed through the intermediary, or by waiting a set amount of time from when the source was configured to start sending the data. Process 400 stays at block 410 until the threshold is met, at which point it continues to block 412.

At block 412, process 400 can obtain the value of an epoch counter for the source shards and cause an epoch counter for the destination shards to be set higher than the source epoch counter (e.g. greater by one or two). In some implementations, epoch counters can be used to determine which of multiple deployments corresponding to a write (or read) operation can accept the write (or read) operation. This can be accomplished when a primary node for the database system receives the write operation and attempts to send that write to its child nodes with the value of the primary node's epoch counter. If the child nodes receive a write operation from another node (e.g. the source), they will not accept it because they are aware of the higher epoch counter of the primary node (e.g. the destination). Thus, setting the destination epoch counter higher than the source epoch counter guarantees that the shards that receive a new write operation from the source will not accept the new write operations after the migration. In some implementations, process 400 can next validate that direct reading and writing is blocked on the destination.

At block 414, process 400 can establish blocking on the source. In various implementations, this blocking can be of both read and write operations or can be of only write operations while read operations are still available. These various implementations correspond to options where reads are either highly consistent so reads are blocked until the consistency obtains (e.g. all or a specified amount of the migration is complete), or eventually consistent where reads remain available throughout the migration.

Once source blocking is established and as the migration proceeds, process 400 can cause clients to redirect their database operations to the destination. This can occur in a separate thread that sends updates to the clients. Process 400 can also validate that write (and read) blocking is working on the source, e.g. by sending a test write (and read) and validating that it is denied or times out. Process 400 can further validate that all pending writes have been accomplished at the source, i.e. that the source writing pipeline is empty. Process 400 can accomplish this by performing a special write operation, at the source, which returns only when the special write is manifested into a score for the source shards. The source can be configured to not block this special type of write operation. The score can be a count of the number of instances that have been stored in a corresponding database. Every time there is an insertion to the database, the score increases by one. The special write returning (e.g. acks back to the source of the special write operation) confirms that the write pipeline is empty. This is because the special write was sent after other new write operations were blocked at the source, so any writes pending when the source write blocking was established will complete before the special write returns.

At block 416, process 400 can wait until the migration of data from the source to the destination is complete. In some implementations, this can be accomplished by waiting until the score for the source is equal to the score for the destination, indicating that the destination is fully caught up to the source. Because the special write has returned at this point, the system can confirm that there will be no more writes on the source. Thus, the transfer of data is complete. Process 400 can remain at block 416 until the transfer of data is complete, at which point it proceeds to block 418.

At block 418, process 400 can cause a configuration change at the source to stop mirroring write operations for the migrated shards to the destination. In some implementations, this can be accomplished by removing the followed flags from the shards at the source. In some implementations, the shards at the source can also be deleted, archived, or their resources can be indicated as available to be taken for other uses. In some implementations, process 400 can also wait for the configuration change to propagate to the various nodes of the source.

At block 420, process 400 can cause a configuration change at the destination for the destination shards to be converted to primary for the migrated data. In some implementations, this can be accomplished by taking the follower flags off the destination shards, converting them to primary shards. In some implementations, process 400 can also wait for the configuration change to propagate to the various nodes of the destination. Process 400 can then verify correct reading and/or writing can be done at the destination by performing test operations. Process 400 can then continue to block 422, where it ends.

Figure 5:
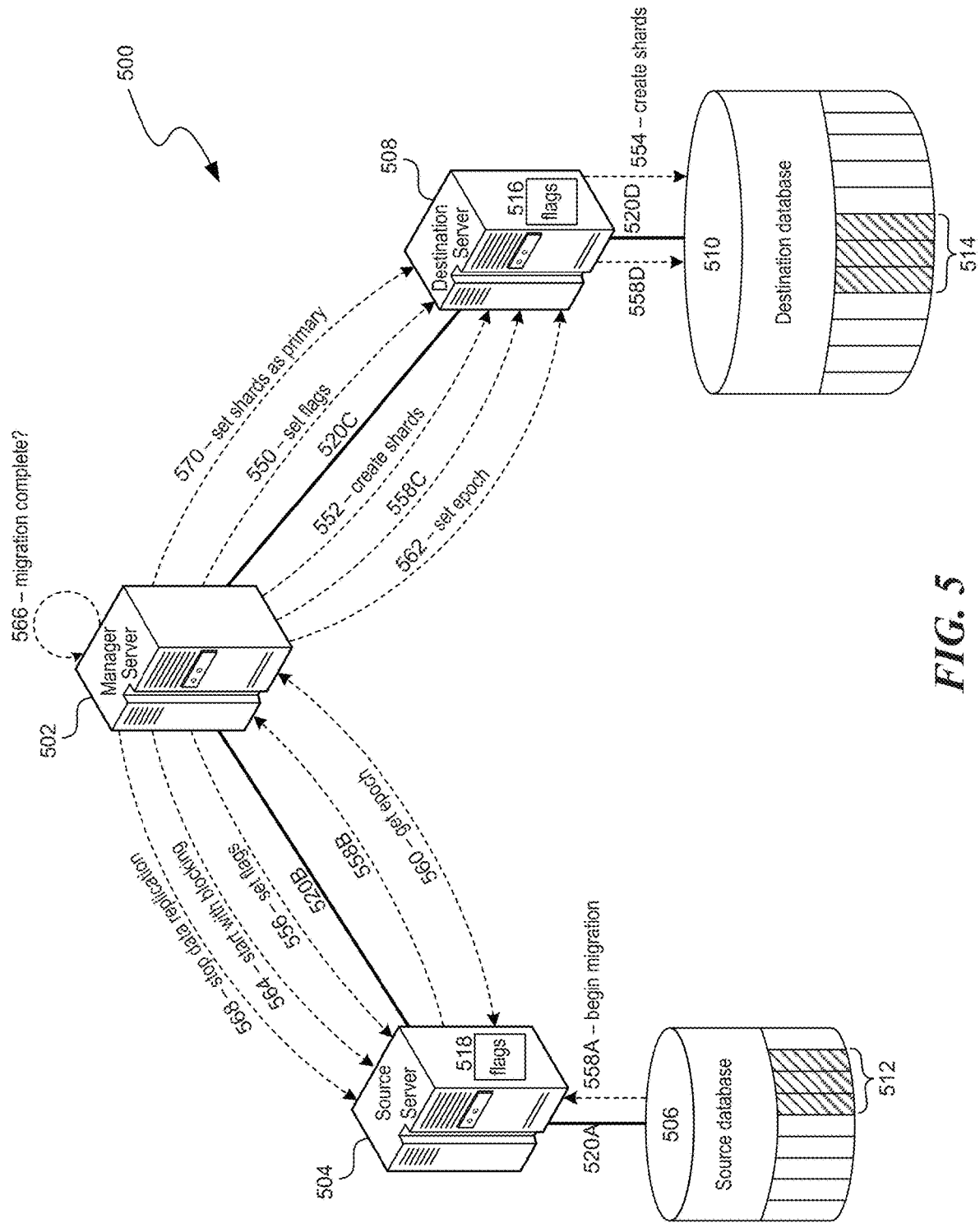
FIG. 5 is a conceptual diagram illustrating an example of shard migration.

FIG. 5 is a conceptual diagram illustrating an example 500 of shard migration. Example 500 includes manager server 502, source server 504 with flags 518, source database 506 with source shards 512, destination server 508 with flags 516, and destination database 510 with destination shards 514. In some implementations, any of manager server 502, source server 504, source database 506, destination server 508, and destination database 510 can comprise multiple machines. For example, source database 506 can include multiple physical machines, each housing a separate shard, of shards 512. Manager server 502, source server 504, source database 506, destination server 508, and destination database 510 can be connected by network links 520A-D. While network links 520A-D are shown as direct links between the devices, these can be any form of network communication and can take a variety of network paths, e.g. through multiple hops across a private or public network.

Steps in example 500 are shown by dashed lines 550-570. Example 500 begins at step 550 when the manager server sets follower flags, of flags 516 at the destination server. The follower flags can control newly created shards at the destination to be follower shards. At step 552, example 500 can instruct new shards to be created at the destination server. This causes, at step 554, destination shards 514 to be created in database 510. Due to the flag set at step 550, the destination shards 514 will be created as follower flags, which will not accept normal read/write traffic from clients.

At step 556, manager server 502 sets followed fags, of flags 518, for shards 512. These flags indicate that shards 512 are followed by shards 514. Setting the followed flags begins migration of data from shards 512 to shards 514, through steps 558A-D. In some implementations, this data migration flows from source server 504 to destination server 508, without going through migration server 502. The followed flags also cause any writes to shards 512, performed thereafter, to be mirrored to shards 514.

At step 560, manager server 502 retrieves the value of an epoch counter from source server 504. At step 562, manager server 502 sets a value of an epoch counter for destination server 508 to be two greater than the value of the epoch counter from source server 504.

At step 564, manager server 502 causes source server 504 to stop accepting future write operations for shards 512. In some implementations, manager server 502 also checks that the write pipeline at source server 504 is empty by performing a special write (not shown) that will return only when the write is complete. In some implementations, manager server 502 can also provide notifications to client devices to begin using destination server 508 to access the migrated data, instead of source server 504.

At step 566, manager server 502 waits until the migration of data from shards 512 to shards 514 is complete. At this point, at step 570, manager server 502 has destination server 508 remove the follower flags from shards 514, causing them to be used as the primary nodes for the migrated data.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for migrating database shards from a source to a destination, comprising:
   causing, at the destination, destination shards to be created as followers of source shards that are at the source;
   causing an epoch counter for the destination shards to be set higher than a corresponding epoch counter for the source shards;
   after the epoch counter for the destination shards is set, causing the source to not accept new writing operations for the source shards;
   verifying that a write pipeline for the source shards is empty;
   after verifying that a write pipeline for the source shards is empty, verifying that migration of data from the source shards to the destination shards is complete; and
   in response to the verification that migration of data from the source shards to the destination shards is complete, causing the destination shards to be primary shards to handle database operations for the data migrated from the source shards.

2. The method of claim 1, wherein the destination shards are configured, by virtue of being follower shards, to not accept requests, from clients, to perform database operations.

3. The method of claim 1, wherein the destination shards are configured, by virtue of being follower shards, to receive stored data sent from the source shards and have write operations mirrored from the source shards to the destination shards.

4. The method of claim 3 further comprising:
   after creating the destination shards, causing, at the source, the source shards to be designated as followed by the destination shards;
   wherein causing the source shards to be designated as followed by the destination shards causes the source to begin the sending of data stored by the source shards to the destination shards and having write operations mirrored from the source shards to the destination shards.

5. The method of claim 4 further comprising, after verifying that migration of data from the source shards to the destination shards is complete, causing the designation, that the source shards are followed by the destination shards, to be removed.

6. The method of claim 1, wherein causing the destination shards to be created as followers of source shards is accomplished by:
   causing a follower flag to be set at the destination; and
   instructing the destination to create the destination shards, wherein the destination shards are created as follower shards due to the follower flag being set.

7. The method of claim 6 further comprising, prior to instructing the destination to create the destination shards, waiting for the setting of the follower flag to propagate to multiple devices that the destination is comprised of.

8. The method of claim 1, wherein the epoch counters, corresponding to the destination and source, control which set of shards can act on a write operation, by virtue of having the higher epoch counter.

9. The method of claim 1, wherein the method is performed while maintaining a particular level of availability, reliability, and consistency of data that is transferred from the source to the destination.

10. A computer-readable storage medium storing instructions that, when executed by a computing system, cause the computing system to perform operations for migrating database shards from a source to a destination, the operations comprising:
    causing, at the destination, destination shards to be created as followers of source shards that are at the source;
    causing an epoch counter for the destination shards to be set higher than a corresponding epoch counter for the source shards;
    after the epoch counter for the destination shards is set, causing the source to not accept new writing operations for the source shards;
    verifying that migration of data from the source shards to the destination shards is complete; and
    in response to the verification that migration of data from the source shards to the destination shards is complete, causing the destination shards to be primary shards to handle database operations for the data migrated from the source shards.

11. The computer-readable storage medium of claim 10, wherein the operations further comprise causing clients to be notified to use the destination for future database operations.

12. The computer-readable storage medium of claim 10, wherein a value of the epoch counter for the destination shards is set to be a value of the corresponding epoch counter for the source, plus two.

13. The computer-readable storage medium of claim 10, wherein causing the source to not accept new writing operations for the source shards includes causing the source to not accept both new writing operations and new reading operations for the source shards.

14. The computer-readable storage medium of claim 10, wherein the operations further comprise verifying that a write pipeline for the source shards is empty by:
performing a special write operation, with the source, that returns an acknowledgement only when the special write is manifested into a score for the source shards; and
waiting to receive the acknowledgement;
wherein verifying that migration of data from the source shards to the destination shards is complete comprises verifying that the score for the source shards matches a score for the destination shards.

15. The computer-readable storage medium of claim 10, wherein causing the destination shards to be primary shards comprises removing follower designations from the destination shards.

16. The computer-readable storage medium of claim 10, wherein the destination shards are configured, by virtue of being follower shards, to:
receive stored data from the source shards and have write operations mirrored from the source shards to the destination shards; and
not accept requests from clients to perform database operations.

17. A system for migrating database shards from a source to a destination, the system comprising:
one or more processors;
a memory;
a destination manager that:
causes, at the destination, destination shards to be created as followers of source shards that are at the source; and
causes an epoch counter for the destination shards to be set higher than a corresponding epoch counter for the source shards;
a source manager that, after the epoch counter for the destination shards is set, causes the source to not accept new writing operations for the source shards; and
a migration manager that verifies that migration of data from the source shards to the destination shards is complete;
wherein the destination manager further, in response to the verification that migration of data from the source shards to the destination shards is complete, causes the destination shards to be primary shards to handle database operations for the data migrated from the source shards.

18. The system of claim 17, wherein the migration of the database shards from the source to the destination is performed as a procedure for combining multiple deployments.

19. The system of claim 17, wherein the migration of the database shards from the source to the destination is performed as a procedure for dividing a single deployment into multiple deployments.

20. The system of claim 17, wherein the source manager further verifies that a write pipeline for the source shards is empty by:
performing a special write operation, with the source, that returns an acknowledgement only when the special write is manifested into a score for the source shards; and
waiting to receive the acknowledgement;
wherein the migration manager verifies that migration of data from the source shards to the destination shards is complete after the acknowledgement is received; and
wherein verifying that migration of data from the source shards to the destination shards is complete comprises verifying that the score for the source shards matches a score for the destination shards.

\* \* \* \* \*